US009723161B2

(12) United States Patent
Araki

(10) Patent No.: US 9,723,161 B2
(45) Date of Patent: Aug. 1, 2017

(54) APPARATUS, INFORMATION PROCESSING SYSTEM, INFORMATION PROCESSING METHOD, AND INFORMATION PROCESSING PROGRAM FOR CHANGING OR PROVIDING FUNCTIONAL CAPABILITIES IN AN APPARATUS

(71) Applicant: Ryoji Araki, Fukuoka (JP)

(72) Inventor: Ryoji Araki, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 26 days.

(21) Appl. No.: 14/987,902

(22) Filed: Jan. 5, 2016

(65) Prior Publication Data
US 2016/0205277 A1 Jul. 14, 2016

(30) Foreign Application Priority Data

Jan. 13, 2015 (JP) ................................. 2015-004249

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ..... *H04N 1/00344* (2013.01); *H04N 1/00244* (2013.01); *H04N 1/00307* (2013.01); *H04N 1/00411* (2013.01); *H04N 2201/0094* (2013.01)

(58) Field of Classification Search
CPC .......... H04N 1/00344; H04N 1/00244; H04N 1/00307; H04N 1/00411; H04N 2201/0094

USPC ............................... 358/1.15, 1.1, 1.14, 1.13
See application file for complete search history.

(56) References Cited

U.S. PATENT DOCUMENTS

| 8,264,717 | B2 | 9/2012 | Araki |
| 8,474,051 | B2 | 6/2013 | Araki |
| 8,488,135 | B2 | 7/2013 | Shimizu et al. |
| 8,711,410 | B2* | 4/2014 | Homma ............ G06F 17/30899 358/1.15 |
| 8,982,386 | B2 | 3/2015 | Araki |
| 9,218,224 | B2 | 12/2015 | Araki |
| 2011/0041144 | A1 | 2/2011 | Araki |
| 2012/0216062 | A1 | 8/2012 | Araki |
| 2013/0254903 | A1 | 9/2013 | Araki |
| 2014/0229931 | A1 | 8/2014 | Araki |
| 2015/0074667 | A1 | 3/2015 | Araki |
| 2015/0264211 | A1 | 9/2015 | Araki |
| 2016/0309057 | A1* | 10/2016 | Kawakami ........... H04N 1/4413 |

FOREIGN PATENT DOCUMENTS

JP      2011-191951      9/2011

* cited by examiner

Primary Examiner — Douglas Tran
(74) Attorney, Agent, or Firm — IPUSA, PLLC

(57) ABSTRACT

An apparatus connected to an information processing apparatus through a first network includes a receiving unit that receives identification information of a program from the information processing apparatus through the first network; an acquiring unit that acquires the program related to the identification information received by the receiving unit through a second network; and a call unit that calls the program acquired by the acquiring unit, wherein the program causes the apparatus to perform a process for data stored in the apparatus.

19 Claims, 12 Drawing Sheets

FIG.7

| APPLICATION ID | PROGRAM ID | LOCAL FILE NAME |
|---|---|---|
| 1 | 00111 | /hdd/lib/libaaa.so |
| 2 | 00111 | /hdd/lib/libaaa.so |
| 3 | 00012 | /hdd/lib/libbbb.so |

| APPLICATION ID | PROGRAM ID/URL | LOCAL FILE NAME |
|---|---|---|
| 1 | http://xxxx/libaaa.so | /hdd/lib/libaaa.so |
| 2 | http://xxxx/libaaa.so | /hdd/lib/libaaa.so |
| 3 | http://xxxx/libbbb.so | /hdd/lib/libbbb.so |

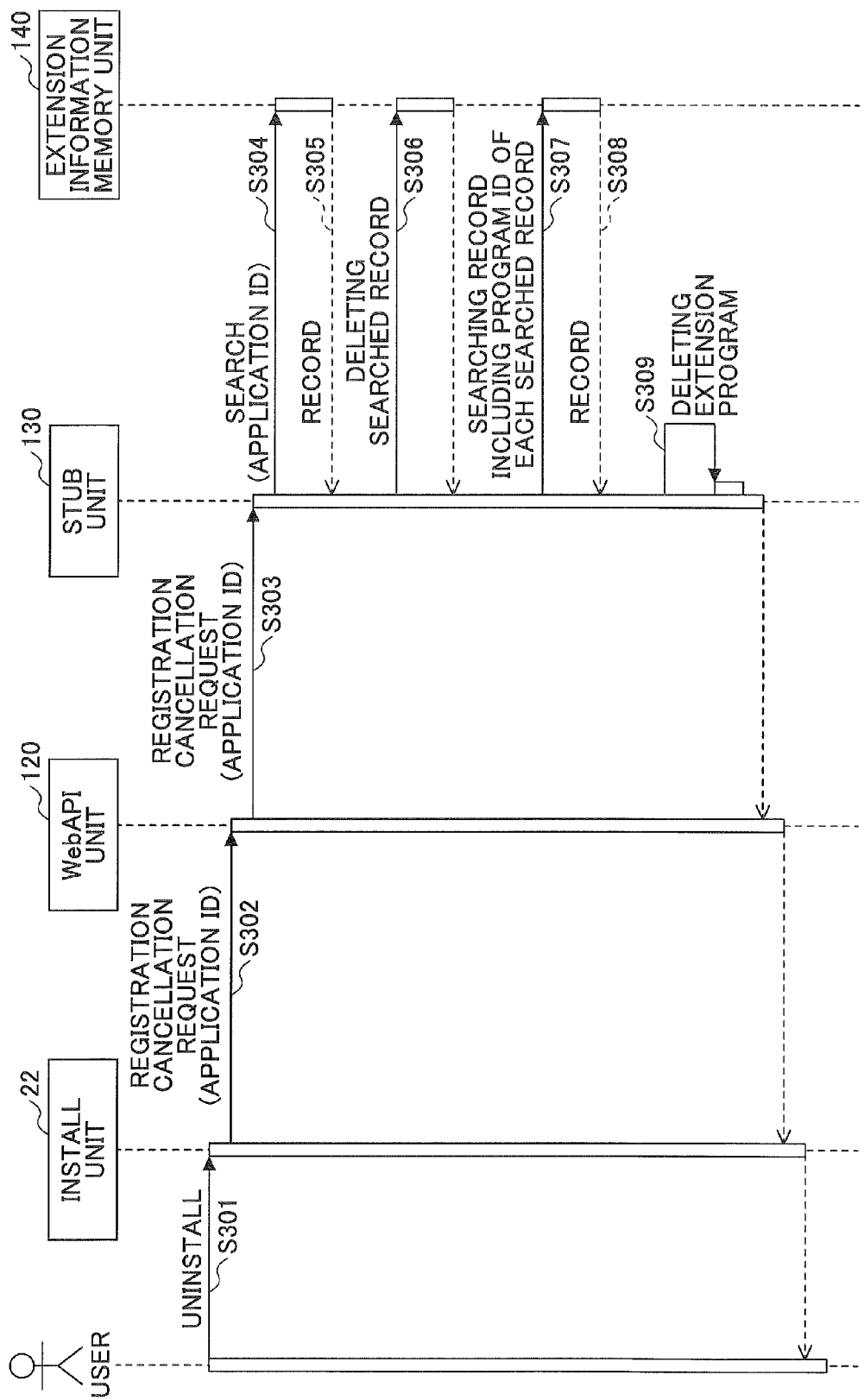

APPARATUS, INFORMATION PROCESSING SYSTEM, INFORMATION PROCESSING METHOD, AND INFORMATION PROCESSING PROGRAM FOR CHANGING OR PROVIDING FUNCTIONAL CAPABILITIES IN AN APPARATUS

BACKGROUND OF THE INVENTION

1. Field of the Invention

The present invention relates to an apparatus, an information processing system, an information processing method, and an information processing apparatus.

2. Description of the Related Art

An example of an apparatus such as an image forming apparatus has an application program interface (API) as an interface enabling various resources related to the apparatus to be used through a network.

SUMMARY OF THE INVENTION

It is a general object of at least one embodiment of the present invention to provide an apparatus that substantially obviates one or more problems caused by the limitations and disadvantages of the related art.

One aspect of the embodiments of the present invention may be to provide an apparatus connected to an information processing apparatus through a first network including a receiving unit that receives identification information of a program from the information processing apparatus through the first network; an acquiring unit that acquires the program related to the identification information received by the receiving unit through a second network; and a call unit that calls the program acquired by the acquiring unit, wherein the program causes the apparatus to perform a process for data stored in the apparatus.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 7 illustrates an exemplary structure of an extension information memory unit of the first embodiment.

FIG. 11 illustrates an exemplary structure of an extension information memory unit of the second embodiment.

FIG. 13 is a sequence chart illustrating an exemplary procedure performed by an information processing terminal and an image forming apparatus of the third embodiment.

DETAILED DESCRIPTION OF THE PREFERRED EMBODIMENTS

An application using various resources related to the apparatus may be installed in a device connected to the above-described apparatus having the API application program interface (API) through the network. For example, an application performing a process related to image data scanned by the apparatus may be installed in a device connected to the apparatus through the network.

In a case where the above application is to perform a processing process not installed in the apparatus or a processing process not substantialized by an API published by the apparatus for the image data scanned by the apparatus, the image data may be transferred to the device in which the application is installed. Thus, the application may directly perform the processing process for the image data.

However, in a case where the communication band of the network connecting the apparatus to the device is narrow, a transfer time of the image data from the apparatus to the device becomes a bottle neck so as to possibly make an overall processing time long.

The present invention is provided in consideration of the above, and an object of the invention is to improve an operability with respect to data stored in the apparatus through a network.

A description is given below, with reference to the FIG. 1 through FIG. 13 of embodiments of the present invention. Where the same reference symbols are attached to the same parts, repeated description of the parts is omitted.

Reference symbols typically designate as follows:
2: information processing system;
10: image forming apparatus;
11: controller;
12: scanner;
13: printer;
14: modem;
15: terminal interface;
16: network interface;
17: SD card slot;
20: information processing terminal;
21: terminal application;
22: install unit;
30: client apparatus;
31: client application;
40: administration server;
80: SD card;
111: CPU;
112: RAM;
113: ROM;
114: HDD;
115: NVRAM;
120: WebAPI unit;
121: registration unit;
122: call receiving unit;
123: data acquiring unit;

124: apparatus controlling unit;
125: mail sending unit;
126: registration canceling unit;
130: stub unit;
140: extension information memory unit;
201: CPU;
202: memory;
203: auxiliary memory device;
204: touch panel;
205: wireless communication device;
206: apparatus interface;
211: display device; and
212: input device.

First Embodiment

Figure 1:
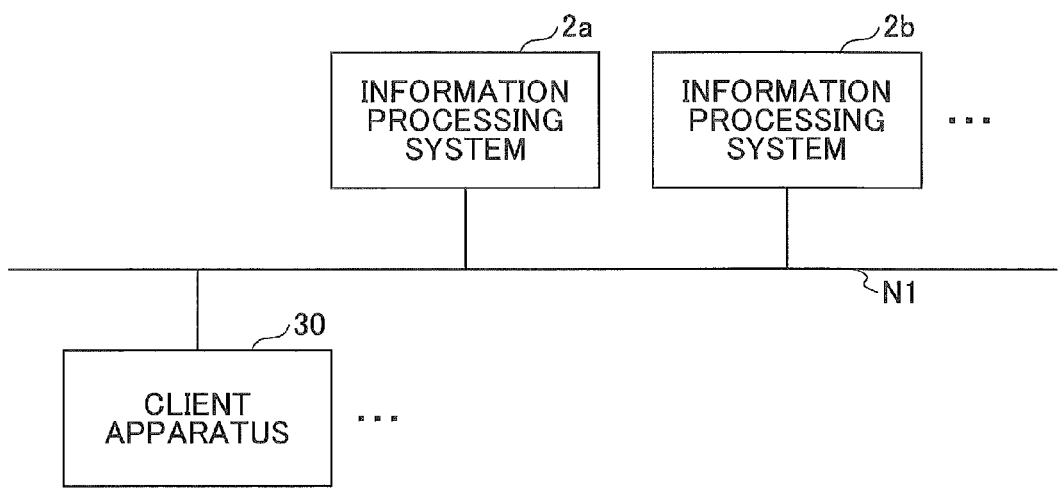
FIG. 1 illustrates an example of a system structure according to a first embodiment.

FIG. 1 illustrates an example of a system structure according to a first embodiment. Referring to FIG. 1, at least one client apparatus 30 and at least one information processing system such as information processing systems 2a and 2b are connected so as to be communicable through a network such as a local area network (LAN) or the Internet. Hereinafter, when the information processing systems 2a and 2b are not distinguished, the information processing systems 2a and 2b are referred to as an "information processing system".

The client apparatus 30 is an example of a device, in which an application program using the application program interface (API) included by the information processing system 2 is installed. An example of the client apparatus 30 is a personal computer (PC), a tablet-type terminal, a smart phone, a mobile phone, or the like.

The information processing system 2 is a set of at least two information processing apparatuses which perform a process by mutually cooperating.

Figure 2:
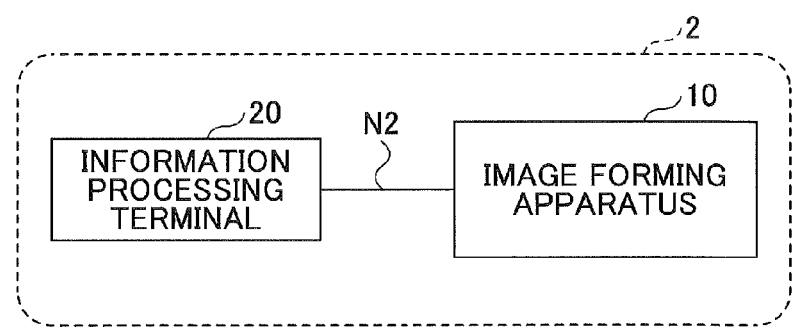
FIG. 2 illustrates an example of a structure of an information processing system of the first embodiment.

FIG. 2 illustrates an exemplary structure of the information processing system of the first embodiment. In the information processing system 2 illustrated in FIG. 2, the image forming apparatus 10 is connected to the information processing terminal 20 so as to be communicable. The communication between the image forming apparatus 10 and the information processing terminal 20 are performed through, for example, a universal serial bus (USB), a short range wireless communication, or a network N2 such as a LAN (wired and wireless).

The image forming apparatus 10 is a multifunction peripheral which can realize at least two of functional capabilities among printing, scanning, copying, and sending and receiving FAX with one casing. However, the apparatus having any one functional capability among printing, scanning, copying, and sending and receiving FAX may be used as the image forming apparatus 10. Further, the apparatus such as a projector, a teleconference system, and a digital camera may be used instead of the image forming apparatus 10. The API included in the information processing system 2 described in reference to FIG. 1 is an API included in the image forming apparatus 10.

The information processing terminal 20 is an apparatus which individually processes information such as a smartphone a tablet-type terminal. Within the first embodiment, the information processing terminal 20 functions as an operation unit of the image forming apparatus 10. Specifically, the information processing terminal 20 is connected to the image forming apparatus 10 instead of a conventional operation unit installed exclusively for the image forming apparatus 10. The information processing terminal 20 is an example of the device, in which the application of using the API included in the image forming apparatus 10 is installed in a manner similar to the client apparatus 30.

The information processing terminal 20 is installed in the image forming apparatus 10 so as to be fixed at a predetermined position (for example, a position where an operation panel is disposed) of the image forming apparatus 10. Therefore, the information processing terminal 20 and the image forming apparatus 10 are understood to be a single device. Alternatively, the information processing terminal 20 may be removable (separable) from the image forming apparatus 10. In a state where the information processing terminal 20 is removed, the information processing terminal 20 may function as an operation unit of the image forming apparatus 10 through wireless communication using Bluetooth ("Bluetooth" is a registered trademark, an infrared ray, a wireless LAN, or the like.

Figure 3:
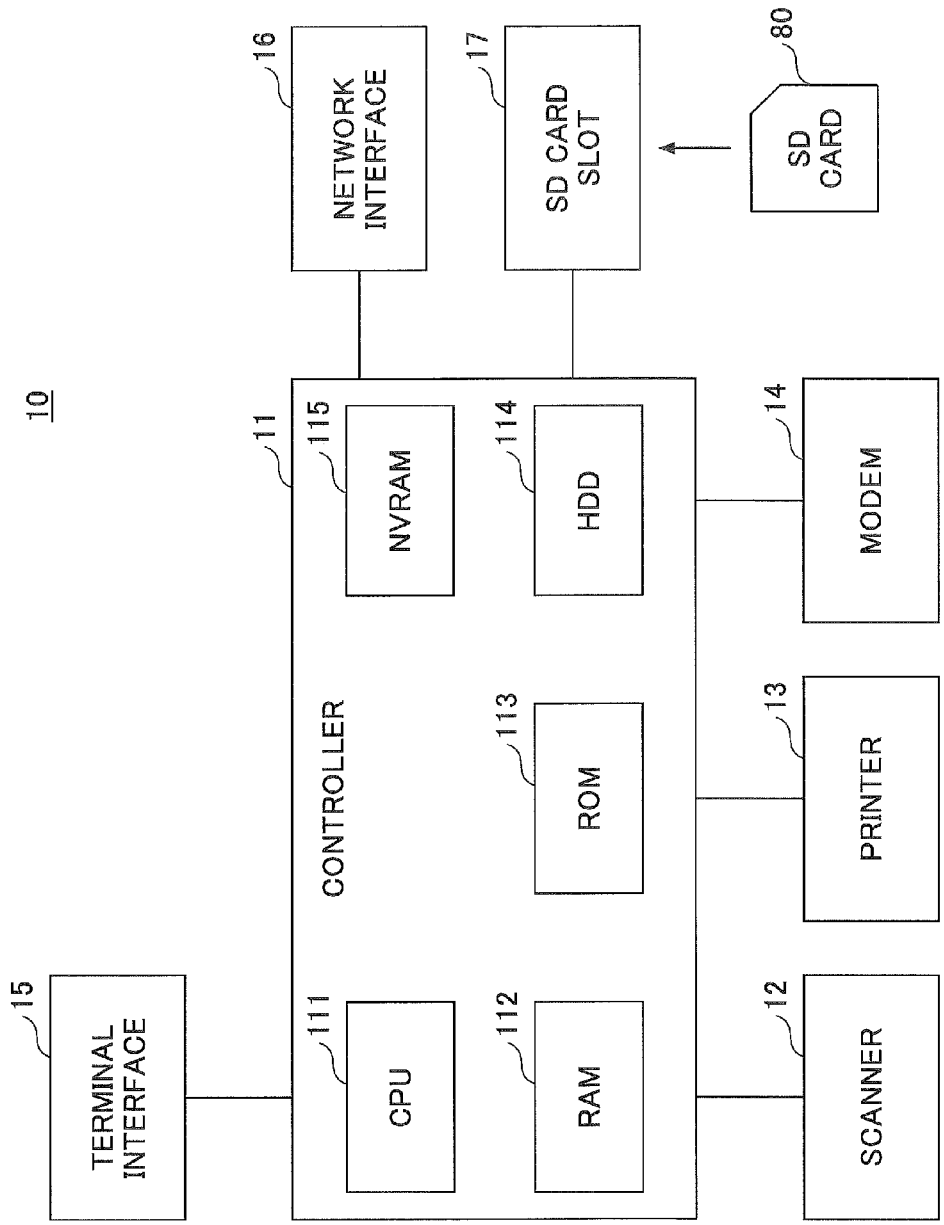
FIG. 3 illustrates an exemplary hardware structure of the image forming apparatus of the first embodiment.

FIG. 3 illustrates an exemplary hardware structure of the image forming apparatus of the first embodiment. Referring to FIG. 3, the image forming apparatus 10 includes hardware such as a controller 11, a scanner 12, a printer 13, a modem 14, a terminal interface 15, a network interface 16, an SD card slot 17, or the like.

The controller 11 includes a CPU 111, a RAM 112, a ROM 113, an HDD 114, an NVRAM 115, and so on. Various programs and data used by the programs are stored in the ROM 113. The RAM 112 is used as a memory area for loading the programs, a work area for the loaded programs, or the like. The CPU 111 substantializes various functional capabilities by processing the program loaded into the RAM 112. The HDD 114 stores programs, various data used by the programs, or the like. The NVRAM 115 stores various setup information or the like.

The scanner 12 is hardware (an image reading unit) for reading image data from an original (an original manuscript). The printer 13 is hardware (a printing unit) for printing print data on a print paper. The modem 14 is hardware for connecting the apparatus 10 to a telecommunication line and is used for sending and receiving the image data with fax communications. The terminal interface 15 is an interface for communicating (connecting) with the information processing terminal 20. For example, the terminal interface 15 is, for example, an USB interface or hardware for a short range wireless communication. The terminal interface 15 may be hardware for connecting the image forming apparatus 10 to a wired or wireless network such as LAN. Within the first embodiment, the terminal interface 15 is connected to the network 12. The network interface 16 is hardware for connecting the apparatus 10 to a wired or wireless network such as LAN. Within the first embodiment, the terminal interface 16 is connected to the network N1. The SD card slot 17 is used to read a program stored in an SD card 80. Said differently, not only the programs stored in the ROM 113 but also the programs stored in the SD card 80 may be loaded into the RAM 112 and executed by the image forming apparatus 10. The SD card 80 may be substituted by another recording medium such as a CD-ROM and a universal serial bus (USB) memory. The kind of the recording medium corresponding to the position of the SD card 80 may not be limited to a predetermined type. In this case, the SD card slot 17 may be replaced by hardware depending on kinds of the recording medium.

Figure 4:
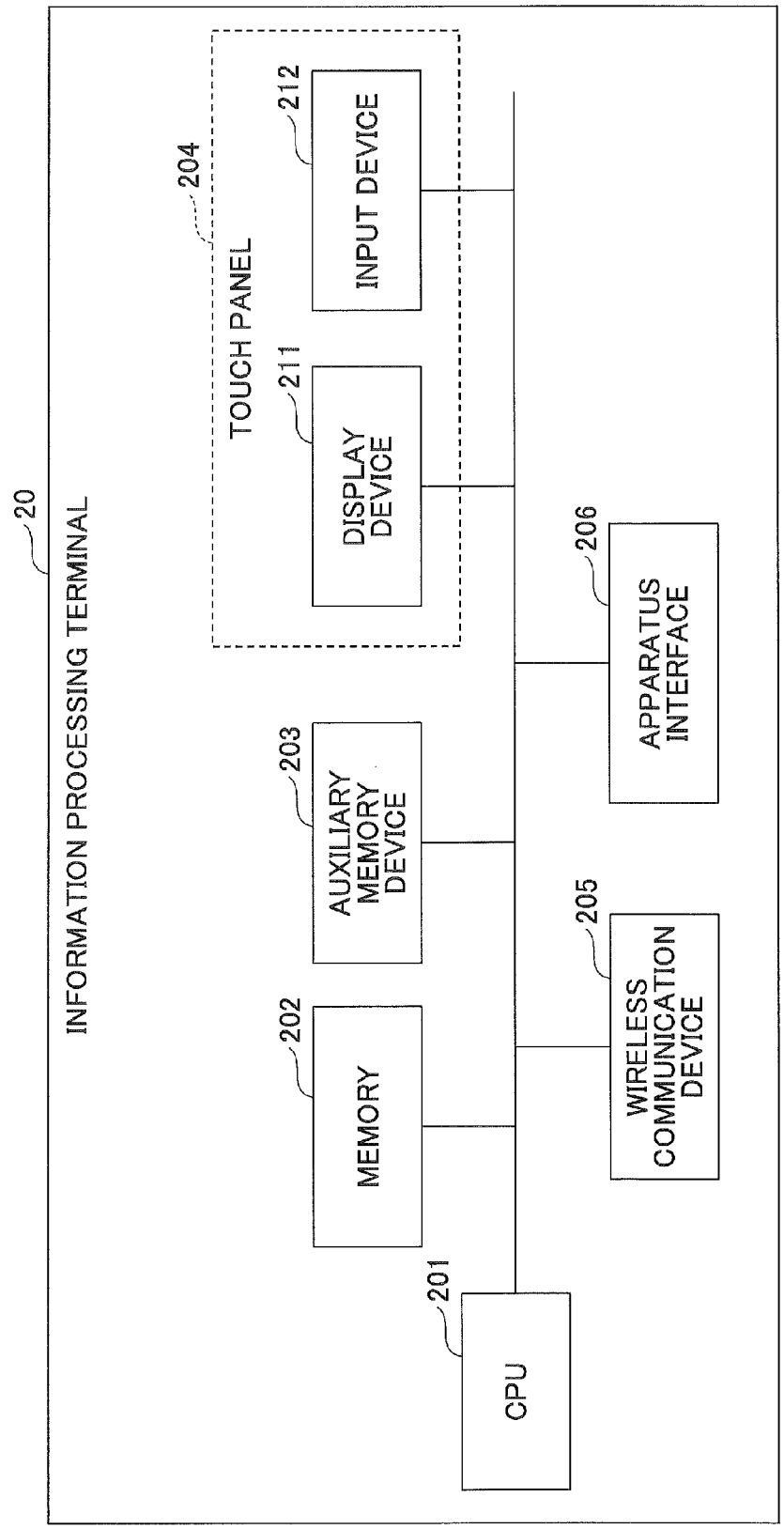
FIG. 4 illustrates an exemplary hardware structure of an information processing apparatus of the first embodiment.

FIG. 4 illustrates an exemplary hardware structure of an information, processing apparatus of the first embodiment. Referring to FIG. 4, the information processing terminal 20 includes a CPU 201, a memory 202, an auxiliary memory device 203, a touch panel 204, a wireless communication device 205, and an apparatus interface 206.

The auxiliary memory device 203 stores a program or the like installed in the information processing terminal 20. The memory 202 reads out the program from the auxiliary memory device 203 when the program is instructed to be invoked and stores the program in the memory 202. The CPU 201 substantializes a functional capability related to the information processing terminal 20 in conformity with the program stored in the memory 202.

The touch panel 204 is an electronic component having both an input functional capability and a display functional capability to display information or receive an input from a user. The touch panel 204 includes a display device 211, an input device 212, or the like.

The display device 211 is a liquid crystal display or the like and performs a display functional capability of the touch panel 204. The input device 212 is an electronic component including a sensor for detecting a touch of a touching object on the display device 211. A detection method of a touching object may be any one of known methods such as an electrostatic method, a resistance film method, and an optical method. The touching object is an object touching a contact surface (a front surface) of the touch panel 204. As an example of the touching object is a finger of a user, a dedicated pen, an ordinary pen, or the like.

The wireless communication device 205 is an electronic component such as an antenna for communications in a wireless local area network (LAN) or a mobile communication network. The apparatus interface 206 is an interface for communicating with an image forming apparatus 10. Said differently, the apparatus interface communicates with the image forming apparatus 10 in a mode corresponding to the terminal interface 15. Within the first embodiment, the apparatus interface 206 is connected to the network N2.

Figure 5:
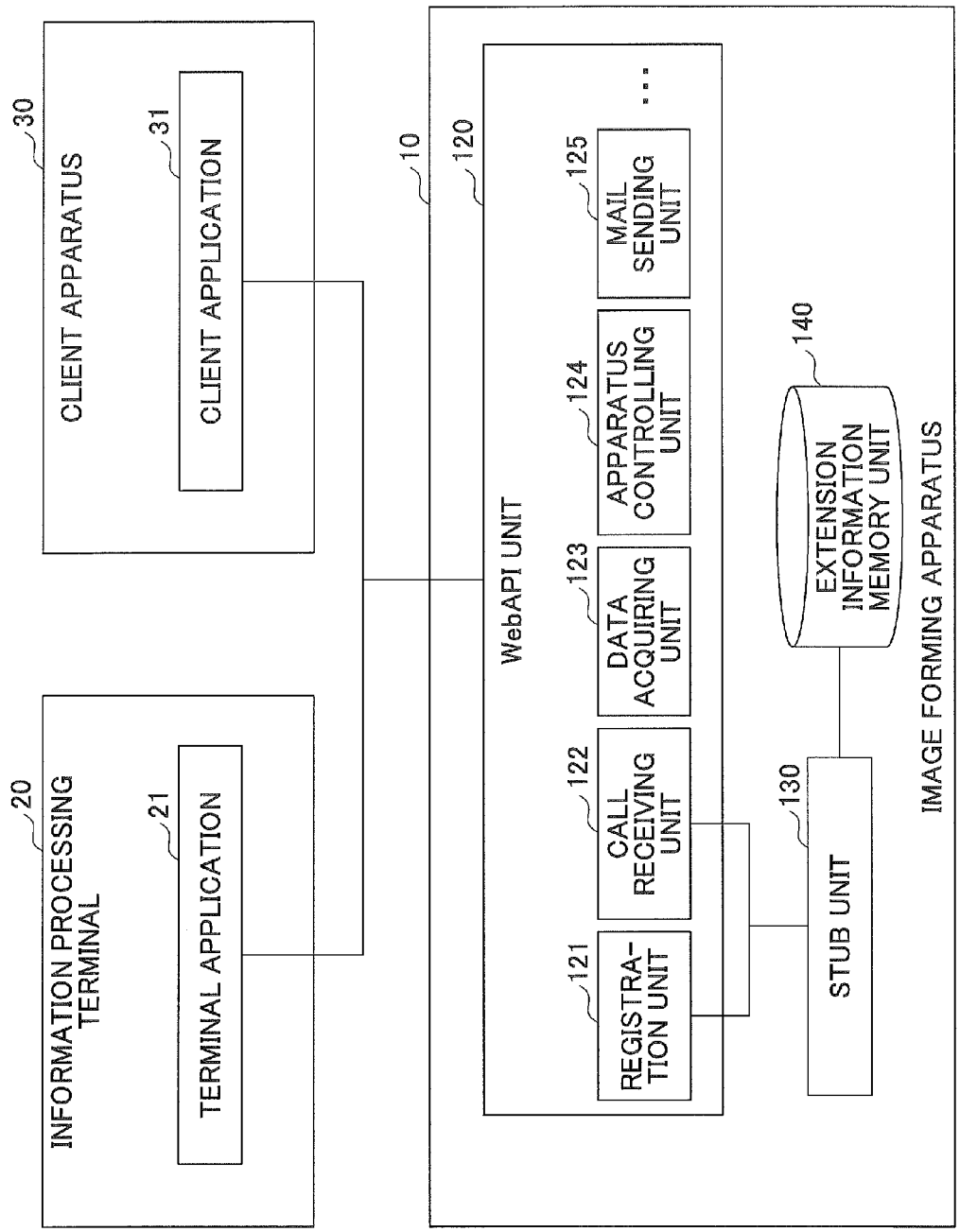
FIG. 5 illustrates an exemplary structure of functional capabilities of apparatuses of the first embodiment.

FIG. 5 illustrates an exemplary structure of functional capabilities of apparatuses of the first embodiment. Referring to FIG. 5, the image forming apparatus 10 includes a WebAPI unit 120 and a stub unit 130. These units are substantialized when one or more programs installed in the image forming apparatus 10 are executed by the CPU 111. The image forming apparatus 10 includes and uses an extension information memory unit 140. The extension information memory unit 140 is substantialized by using the HDD, the NVRAM 115, or a memory device connectable to the image forming apparatus 10 through the network.

The WebAPI unit 120 provides the API as the interface enabling the various resources of the image forming apparatus 10 to be operated from the outside and includes the installed API. Within the first embodiment, the WebAPI unit 120 provided the API using a Web interface. For example, the API provided by the WebAPI unit 120 is called by using a HyperText Transfer Protocol (HTTP). Further, the API may conform with Representational State Transfer (REST). Hereinafter, the API provided by the WebAPI unit 120 is referred to as a "WebAPI". However, a specific API provided by the WebAPI unit 120 may not depend on a specific protocol.

Referring to FIG. 5, the WebAPI unit 120 includes a registration unit 121, a call receiving unit 122, a data acquiring unit 123, an apparatus controlling unit 124, a mail sending unit 125, and so on. These units are substantialized by a process obtained by causing any function or any method (hereinafter, integrally referred to as the "function") among a function group or a method group each forming a WebAPI to perform using the CPU 111.

The registration unit 121 corresponds to a registration function being one of the WebAPI. The registration function is a function for receiving a registration request requesting the image forming apparatus 10 to register the program. Said differently, the registration unit 121 requests the stub unit 130 to register the program in response to a receipt of the registration request of requesting the image forming apparatus 10 to register the program from the information processing terminal 120 or the client apparatus 30. This program is provided to temporarily or successively change or extend the functional capability of the image forming apparatus 10. Hereinafter, this program is referred to as an "extension program". The extension program is preferably a program enabled to be dynamically called such as a Dynamic Link Library (DLL), Java ("Java" is a registered trademark) Archive (JAR) file, or a script (for example, a Java ("Java" is a registered trademark) script), or the like. The expression of "enabled to be dynamically called" means that a static link or the like is not required.

The call receiving unit 122 corresponds to a call function being one of the WebAPI. The call function is a function of receiving a call request of requesting to calling the extension program. Said differently, the call receiving unit 122 requests the stub unit 130 to call the extension program in receipt of the call request for the extension program from the information processing terminal 120 or the client apparatus 30.

The data acquiring unit 123 corresponds to a data acquiring function being one of the WebAPI. The data acquiring function is a function for receiving a data acquiring request of requesting to acquire data stored in the image forming apparatus 10. Said differently, the data acquiring unit 123 returns the data corresponding to identification information designated in the data acquiring request in receipt of the data acquiring request from the information processing terminal 20 or the client apparatus 30. An example of these data is image data scanned by the image forming apparatus 10 or print data received by the image forming apparatus 10 and are waiting for an output.

The apparatus controlling unit 124 corresponds to a control function being one of the WebAPI. The control function is a function of receiving a control request of requesting to control a hardware resource of the image forming apparatus 10. Said differently, the apparatus controlling unit 124 causes the image forming apparatus 10 to perform an action requested by the control request in receipt of the control request of controlling the image forming apparatus 10 from the information processing terminal 20 or the client apparatus 30. An example of this control request is an execution request of requesting to scan.

The mail sending unit 125 corresponds to a mail sending function which is one of the WebAPI. The mail sending function is a function of receiving an email sending request of requesting to send an email. Said differently, the mail sending unit 125 sends an email including information designated in the email sending request to a destination address designated in the email sending request in receipt of the email sending request received from the information processing terminal 20 or the client apparatus 30.

The stub unit 130 performs a registration process of registering an extension program requested to register by the registration unit 121, a call process of calling the extension program requested to call by the call receiving unit 122, and so on. The registration of the extension program is to store the extension program at, for example, a predetermined position (for example, a predetermined folder) in, for example, the HDD 114 administered by the stub unit 130. The extension program includes an interface (for example, a function having a predetermined name) planned to be used by the stub unit 130. The stub unit 130 calls the extension program through the interface.

The extension information memory unit 140 stores identification information registered by the stub unit 130 and identification information of a terminal application 21 or a client application 31, which is a source of the registration request for the extension program, while associating these identification information.

The information processing terminal 20 includes the terminal application 21. The terminal application 21 is an example of the application program using the WebAPI of the image forming apparatus 10. The information processing terminal 20 may include multiple kinds of the terminal application 21.

The client apparatus 30 including the client application 31. The client application 31 is an example of the application program using the WebAPI of the image forming apparatus 10. The client apparatus 30 may include multiple kinds of the client application 31.

The terminal application 21 and the client application 31 may be made in a format suitable for the information processing terminal 20 or the client apparatus 30, which is an install destination. For example, the programming language of the terminal application 21 and the programming language of the client application 31 may be mutually different.

Described next is procedures performed by the information processing terminal 20 and the image forming apparatus 10. In the following description, the information processing terminal 20 may be replaced by the client apparatus 30.

Figure 6:
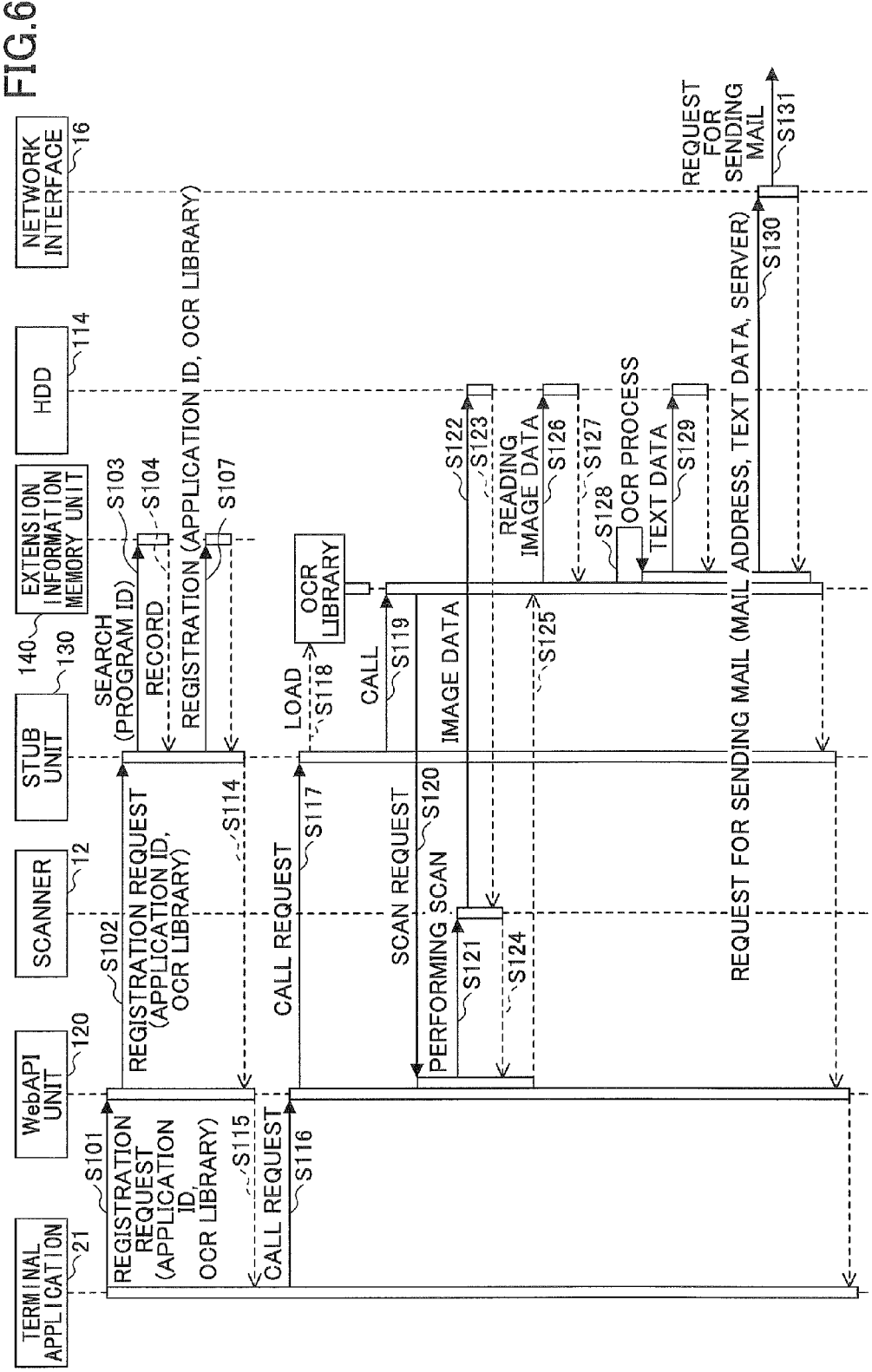
FIG. 6 is a sequence chart illustrating an exemplary procedure performed by an information processing terminal and an image forming apparatus of the first embodiment.

FIG. 6 is a sequence chart illustrating an exemplary procedure of a process performed by the information processing terminal and the image forming apparatus of the first embodiment.

In step S101, the terminal application 21 calls the registration function being one of the WebAPI. Said differently, the terminal application 21 sends the registration request for the extension program to the image forming apparatus 10 through the network N2. This registration request includes identification information (hereinafter, referred to as an "application ID") of the terminal application 21 and an extension program as a registration target. Within the first embodiment, an "OCR library" is an example of the extension program. The OCR library is a program for causing the image forming apparatus 10 to scan an original manuscript to obtain image data, to perform an Optical Character Recognition (OCR) process for the image data, and to perform a process of sending text data obtained by the OCR process using the email. Within the first embodiment, the image forming apparatus 10 does not have an OCR functional capability. Alternately, the image forming apparatus 10 does not have an OCR functional capability satisfying a level required by the terminal application 21.

The registration function may be called at a time of installing in the terminal application 21 or at a predetermined timing after the install. In a case where the registration function is called at the time of the install, the call may be done by an installer of the terminal application 21. In this case, the application ID and the OCR library may be acquired from an install package of the terminal application 21.

The registration unit 121, which is a part of the WebAPI unit 120, transfers the registration request to the stub unit 130 in receipt of the registration request (step S102). The OCR library including the registration request may include identification information (hereinafter, a "program ID") and setup information, which relate to the OCR library, in addition to a program body of the OCR library. The setup information may include a parameter related to the scan, a parameter related to the OCR process, a parameter related to the mail sending process, and so on.

Subsequently, the stub unit 130 searches the extension information memory unit 140 for a record including the program ID of the OCR library included in the registration request (step S103).

FIG. 7 illustrates an exemplary structure of the extension information memory unit of the first embodiment. Referring to FIG. 7, the extension information memory unit 140 stores a local file name in association with the application ID and the program ID.

The application ID is an application ID of the terminal application 21 or the client application 31, which is the source of the registration request for the extension program. The program ID is a program ID of the extension program of the registration target. The local file name is identification information of a storage destination of the extension program being the registration target. The extension program may be stored in a format other than the file.

In step S104, all records including the program ID included in the registration request are searched. In a case where the corresponding record is not searched for, the OCR library is not registered. Then, the stub unit 130 stores the OCR library at a predetermined position, and a record including a local file name indicative of the application ID, the program ID, and the predetermined position in the extension information memory unit 140 (step S107). For example, the OCR library may be stored in the HDD 114.

Alternatively, in a case where there exists no record including the application ID included in the registration request in the searched records, the stub unit 130 produces a copy of any one of the searched records and replaces a value of the application ID of the produced record with the application ID included in the registration request. The stub unit 130 registers the record whose application ID has been replaced in the extension information memory unit 140 (step S107). Said differently, because the OCR library itself has already been stored, an association between the terminal application 21 and the OCR library is newly registered. With this, it is possible to prevent the same OCR libraries from being stored at multiple locations so as to reduce a consumption of a memory capacity in the HDD 114, the NVRAM 115, or the like.

Alternatively, in a case where the corresponding records have been searched and there exists the record including the application ID included in the registration request, the stub unit 130 does not perform step S107.

Subsequently, the stub unit 130 returns a response to the registration unit 121 (step S114). The registration unit 121 returns a response to the terminal application 21 in receipt of the response from the stub unit 130 (step S115).

Subsequently, the terminal application 21 calls the call function being one of the WebAPI (step S116). Said differently, the terminal application 21 sends the call request for the extension program to the image forming apparatus 10 through the network N2. The call request may include the program ID of the extension program, which is a target of the call. The call request for the extension program may be understood as an execution request of the extension program.

The call receiving unit 122 being a part of the call receiving unit 122 reports the call request to the stub unit 130 in receipt of the call request (step S117). Subsequently, the stub unit 130 searches the extension information memory unit 140 for the record including the program ID designated in the call request so as to specify the local file name of the extension program being the target of the call. The stub unit 130 dynamically loads the OCR library related to the local file name into the RAM 112 (step S118). Subsequently, the stub unit 130 calls a predetermined function provided in the OCR library so as to execute the OCR library (step S119). Hereinafter, the process obtained when the OCR library causes the CPU 111 to execute is described as a process executed by the OCR for convenience.

Subsequently, the OCR library calls a control function being one of the WebAPI so as to request the apparatus controlling unit 124 to scan (step S120). Said differently, the OCR library sends the execution request for the scan to the apparatus controlling unit 124 through the control function. Thus, the WebAPI may be called from an inside of the image forming apparatus 10.

The apparatus controlling unit 124 causes the scanner 12 to scan the original manuscript in receipt of the execution request (step S121). Here, the original manuscript is previously set by the user. The image data obtained by scanning the original manuscript with the scanner are stored at a predetermined position (for example, a predetermined folder) of the HDD 114 (step S122). After the image data is stored and a control of the process returns to the apparatus controlling unit 124 (steps S123 and S124), the apparatus controlling unit 124 returns a response to the OCR library (step S125). The identification information (hereinafter, referred to as a "data ID") of the stored image data may be included in the response. The data ID may be a file name or identification information of another form.

Subsequently, the OCR library reads the image data corresponding to the data ID from the HDD 114 to the RAM 112 (steps S126 and S127). The OCR library performs the OCR process for the read image data (step S128). Text data are generated by the OCR process. Subsequently, the OCR library stores the text data in the HDD 114 (step S129). However, the text data are not necessarily stored. Subsequently, the OCR library sends an email sending request, which includes the text data in its body text and has a destination address of a predetermined mail address, to a predetermined mail server using the network interface 16 (steps S130 and S131). As a result, the email including the text data is sent to the predetermined mail address. The predetermined mail address, the IP address of the predetermined mail server, and so on may be included in, for example, the setup information of the OCR library.

The registration function and the call function may not be mutually distinguished. Alternatively, a single function substantializing functional capabilities of both the registration function and the call function may be installed. In this case, steps on or after step S118 may be performed after step S113. However, by distinguishing the registration function from the call function, occasions of transferring the extension programs every time when the same extension program is called by multiple times may be reduced, for example.

Subsequently, as a reference, described is an example of a procedure for substantializing the same functional capability as the functional capability substantialized by the procedure described in FIG. 6 in a case where there are not the registration function and the call function, said differently, the extension program (the OCR library) is not applied to the image forming apparatus 10.

Figure 8:
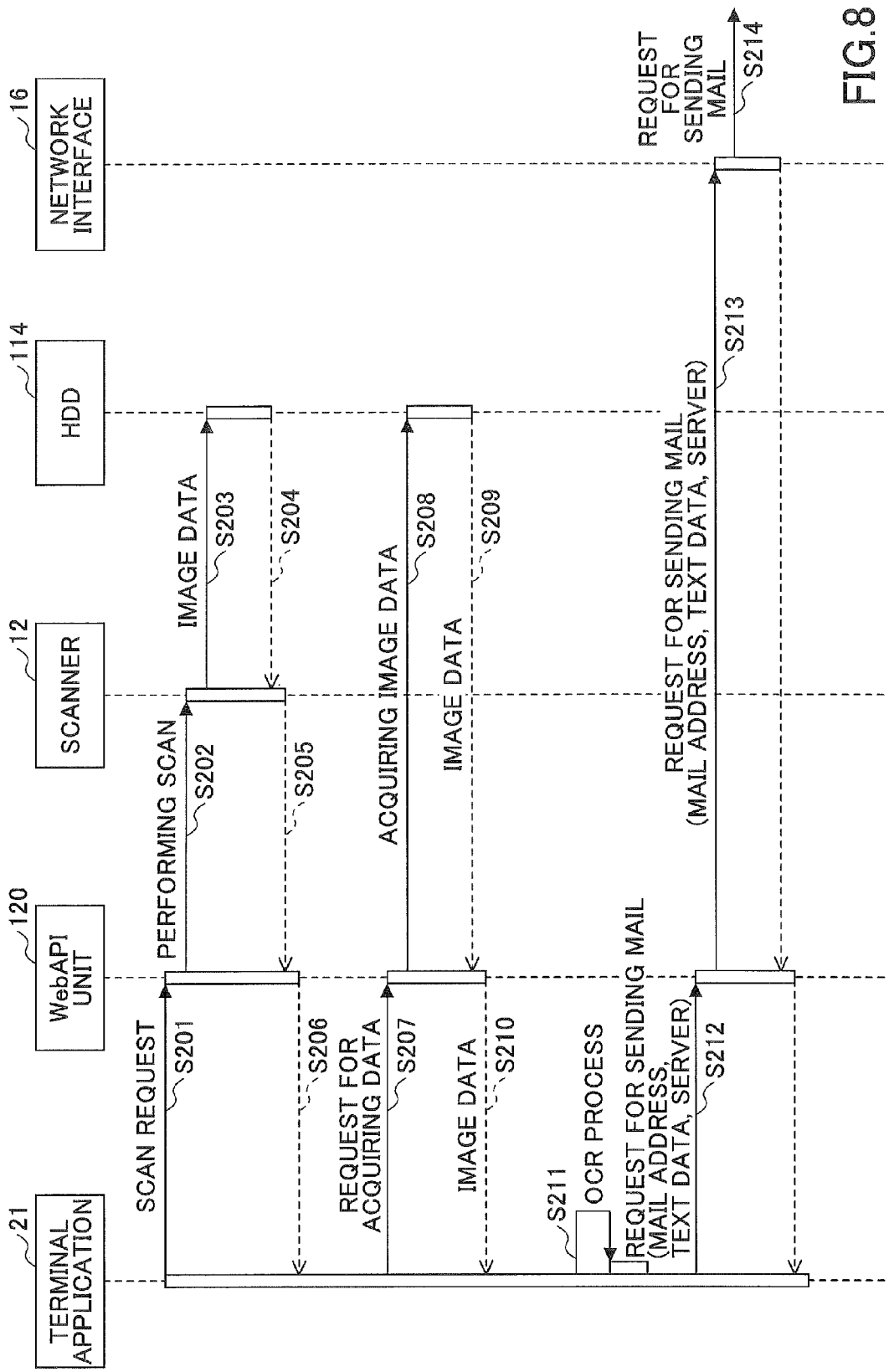
FIG. 8 is a sequence chart illustrating an exemplary procedure performed when an extension program is not applied.

FIG. 8 is a sequence chart illustrating an exemplary procedure performed when the extension program is not applied.

In step S201, the terminal application 21 calls the control function being one of the WebAPI so as to request the image forming apparatus 10 to scan (step S201). Said differently, the terminal application 21 sends the execution request for the scan to the apparatus controlling unit 124 through the network N2. The apparatus controlling unit 124 causes the scanner 12 to scan the original manuscript in receipt of the execution request (step S202). The image data obtained by scanning the original manuscript using the scanner are stored in the HDD 114 (step S203). After the image data is stored and a control of the process returns to the apparatus controlling unit 124 (steps S204 and S205), the apparatus controlling unit 204 returns a response to the terminal application (step S206). The data ID of the stored image data may be included in the response.

Subsequently, the terminal application 21 calls the data acquiring function being one of the WebAPI (step S207). Said differently, the terminal application 21 sends a data acquiring request to the image forming apparatus 10 through the network N2. The data acquiring request includes a data ID. The data acquiring unit 123 being a part of the WebAPI unit 120 acquires the image data corresponding to the data ID included in the data acquiring request from the HDD 114 in receipt of the data acquiring request (steps S208 and S209). Subsequently, the data acquiring unit 123 returns a response including the image data to the terminal application 21 through the network N2 (step S210).

Subsequently, the terminal application 21 performs the OCR process for the image data (step S211). Text data are generated by the OCR process. Subsequently, the terminal application 21 calls the mail sending function being one of the WebAPI. Said differently, the terminal application 21 sends the email sending request of requesting to send an email to the image forming apparatus 10 through the network N2. The email sending request includes the text data generated by the OCR process, the mail address of the destination address, the IP address of the mail server, and so on.

The mail sending unit 125 being a part of the WebAPI unit 120 sends the email sending request, which includes the text data included in the email sending request in its body text and has the destination address of the mail address included in the email sending request, to the mail server using the network interface 16 in receipt of the email sending request (steps S130 and S131). As a result, the email including the text data is sent to the mail address.

Referring to FIG. 8, the image data are transferred from the image forming apparatus 10 to the information processing terminal 20 through the network N2 in step S207. This is because the image forming apparatus 10 does not have the OCR functional capability necessary for the terminal application 21 and the terminal application 21 needs to perform the OCR process. Further, in step S211, the text data are transferred from the information processing terminal 20 to the image forming apparatus 10.

On the other hand, referring to FIG. 6, the image data and the text data are not transferred between the information processing terminal 20 and the image forming apparatus 10 through the network N2. Referring to FIG. 6, the OCR functional capability may be dynamically added to the image forming apparatus 10 when the extension program is dynamically applied to the image forming apparatus 10. However, referring to FIG. 6, it is necessary that the extension program is transferred from the information processing terminal 20 to the image forming apparatus 10 through the network N2. Therefore, if the data size of the extension program is smaller than the sum of the data sizes of the image data and the text data, the possibility of shortening the overall process time is higher in the process illustrated in FIG. 6. Further, by making the extension program using a script or the like, a transfer load of the extension program may be lowered. The data sizes of the program and the script are ordinarily smaller than the data size of the image data. Further, the number of times of sending the extension program to the image forming apparatus 10 is one in step S102. Therefore, ordinarily, the process illustrated in FIG. 6 may further lower a communication load between the information processing terminal 20 and the image forming apparatus 10.

As described above, within the first embodiment, operability for the data stored in the apparatus through the network may be improved. Specifically, in the case where the information processing terminal 20 functions as the operation unit for the image forming apparatus 10 as in the first embodiment, various communications between the information processing terminal 20 and the image forming apparatus 10 such as an input instruction by the user and a response from the image forming apparatus 10 are required to be performed at a high speed. Therefore, if data having a large data size are transferred between the information processing terminal 20 and the image forming apparatus 10, a possibility of degrading the response of the operation unit becomes higher. As a result, the user highly possibly feels stressed. Within the first embodiment, the above situation may be prevented from occurring.

Steps S201 to S206 in FIG. 8 may be performed before step S101 in FIG. 6 or before step S116 in FIG. 6. In this case, steps S120 to S125 may not be performed. Said differently, a process related to the scan job may not be installed in the OCR library. Further, an output method of outputting the text data generated by the OCR process may be other than a mail send. Said differently, the process installed in the extension program is not specifically limited.

Further, a data process (an image process) obtained when the extension program causes the image forming apparatus 110 to execute may be a process other than the OCR process. This data process may be a conversion process for the image data or a generation process for print data related to the image data. The image data being an object of processing by the extension program may not be image data input in response to a request from the information processing terminal 20. For example, data previously stored in the image forming apparatus 10 may be the object of processing by the extension program.

Second Embodiment

Next, a second embodiment is described. Differences of the second embodiment from the first embodiment are described below. Features of the second embodiment, which are not specifically described, are substantially the same as those of the first embodiment.

Figure 9:
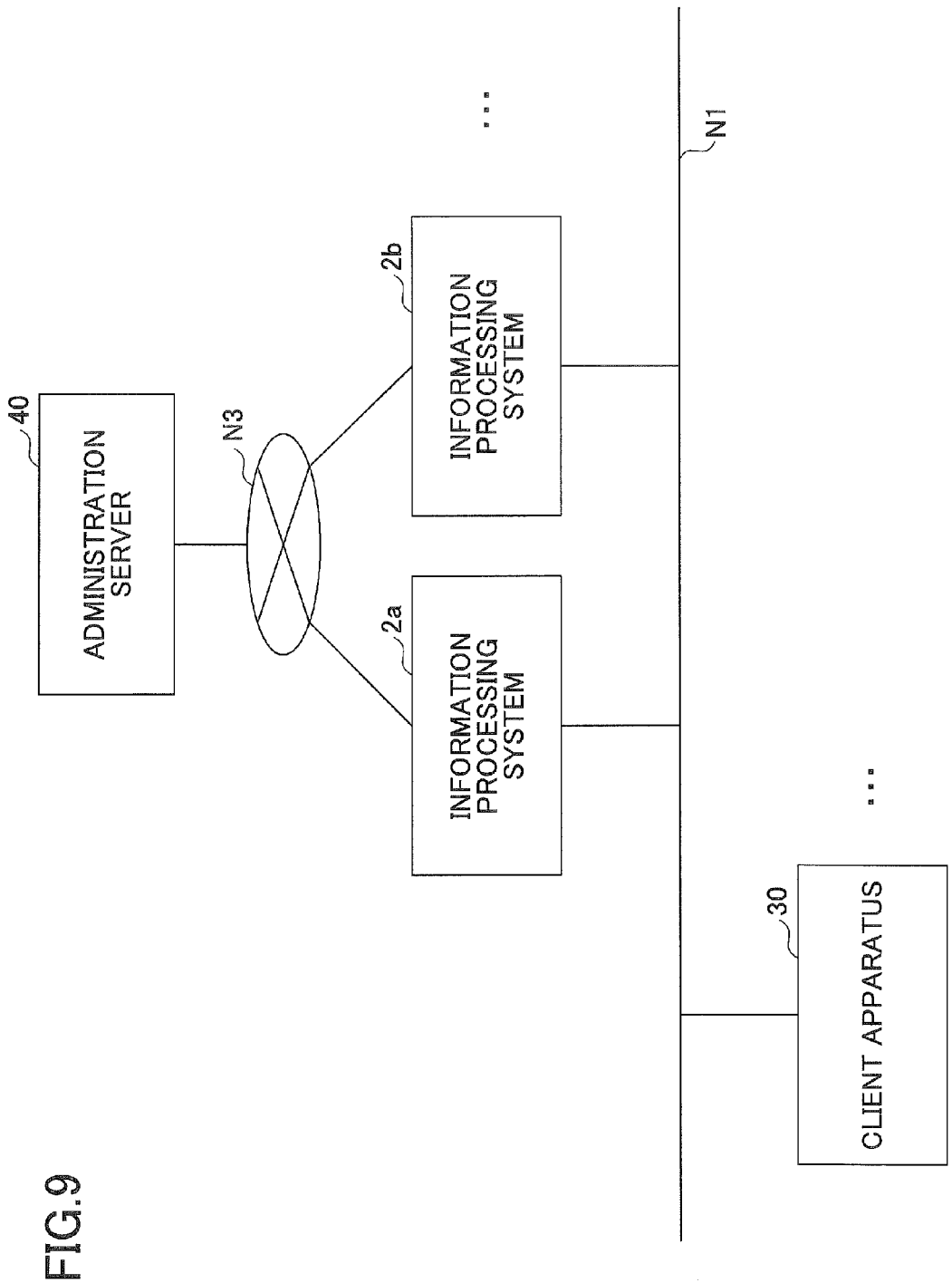
FIG. 9 illustrates an example of a system structure according to a second embodiment.

FIG. 9 illustrates an example of a system structure according to the second embodiment. Referring to FIG. 9, the same reference symbols as those in FIG. 1 are given to the same portions, and explanation of these portions is omitted. Referring to FIG. 9, the information processing system 2 is connected to an administration server 40 through a network N3 such as a LAN and the Internet. The network N3 may be the same network as the network N1. The administration server 40 is at least one computer or at least one memory device, which stores an extension program group. Within the second embodiment, the content of the extension program is downloaded by the stub unit 130 from the administration server 40.

Figure 10:
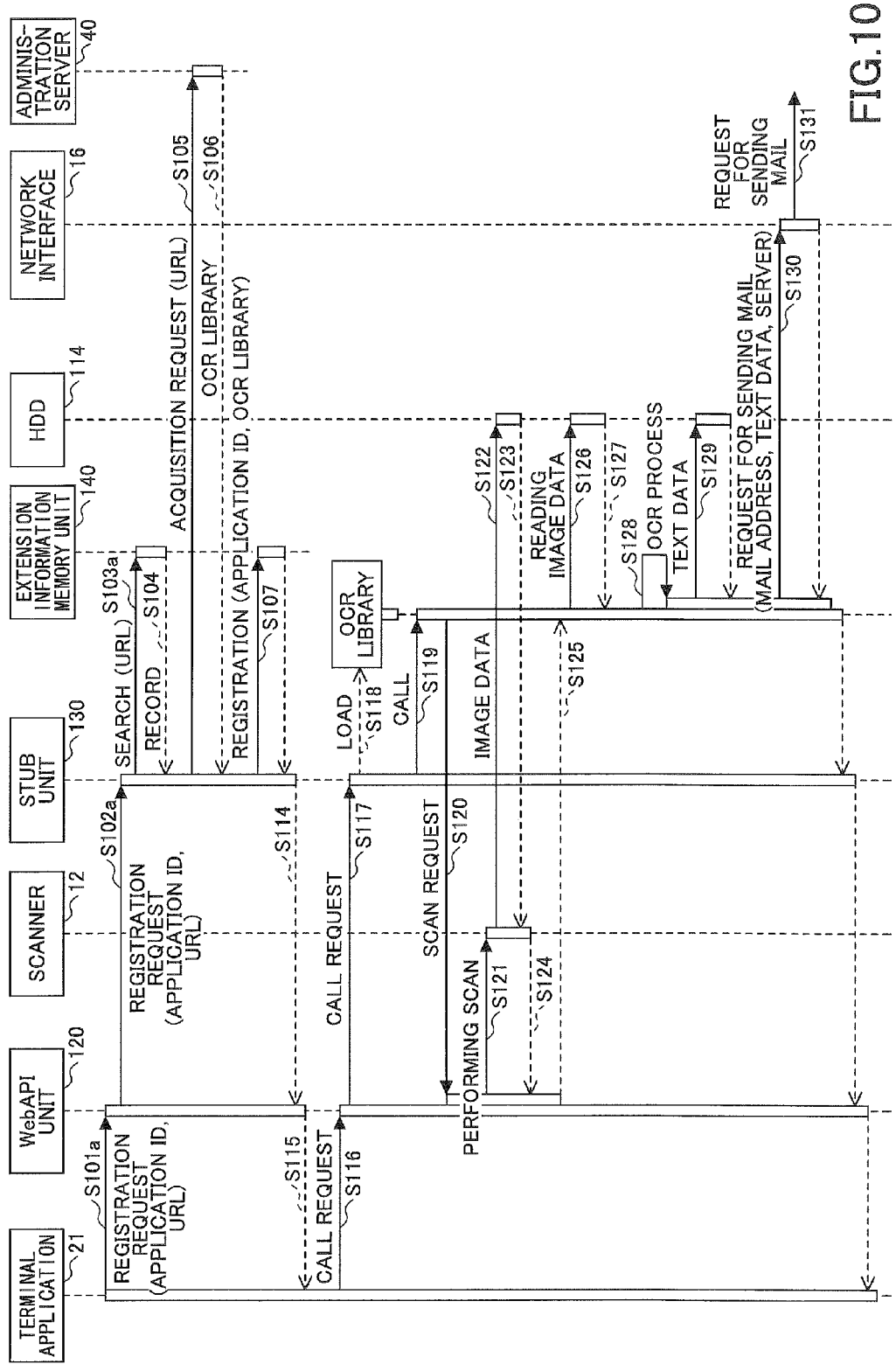
FIG. 10 is a sequence chart illustrating an exemplary procedure performed by an information processing terminal and an image forming apparatus of the second embodiment.

FIG. 10 is a sequence chart illustrating an exemplary procedure of a process performed by the information processing terminal and the image forming apparatus of the second embodiment. Referring to FIG. 10, the same reference symbols as those in FIG. 6 are given to the corresponding portions, and explanation of these portions is omitted.

Referring to FIG. 10, steps S101, S102, and S103 are replaced by steps S101a, S102a, and S103a. Within the second embodiment, identification information indicative of the extension program is designated in an argument of the registration function instead of the extension program. Within the second embodiment, a Uniform Resource Locator (URL) is used as an example of the identification information. Therefore, in the registration request in steps S101a and S102a, an application ID and the URL of the OCR library are included.

Further, within the second embodiment, the URL for the extension program is used as the program ID of the extension program. Therefore, in step S103a, the stub unit 130 searches the extension information memory unit 140 for a record including the program ID of the OCR library included in the registration request (step S103a).

FIG. 11 illustrates an exemplary structure of the extension information memory unit of the second embodiment. Referring to FIG. 11, the URL is stored in the item of the program ID.

Further, referring to FIG. 13, in a case where the corresponding record is not searched for, steps S105 and S106 are performed.

In step S105, the stub unit 130 sends an acquisition request of requesting to acquire the extension program related to the URL included in the registration request to the administration server 40 through the network N3. The administration server 40 returns the OCR library related to the URL (step S106). In step S107, the process described in FIG. 10 is performed other than that the returned OCR library is the object of processing.

As described above, within the second embodiment, the terminal application 21 installs the extension program corresponding to the identification information into the image forming apparatus 10 by designating the identification information such as the URL. Within the second embodiment, it is possible to reduce a necessity of transferring the extension program through the network N2. As a result, the load on the network N2 is further reduced.

The first embodiment and the second embodiment may be combined to perform their processes. For example, the case where the content of the extension program is designated in the registration function and the case where the URL of the extension program is designated in the registration function may be mixed. In the case where the content of the extension program is designated in the registration function, the procedure described in the first embodiment may be performed. In the case where the URL of the extension program is designated in the registration function, the procedure described in the second embodiment may be performed.

Third Embodiment

Next, a third embodiment is described. Within the third embodiment, described is an uninstall of the extension program along with an uninstall of the terminal application 21 or the client application 31. The third embodiment may be performed by combining the third embodiment with the first or second embodiment.

Figure 12:
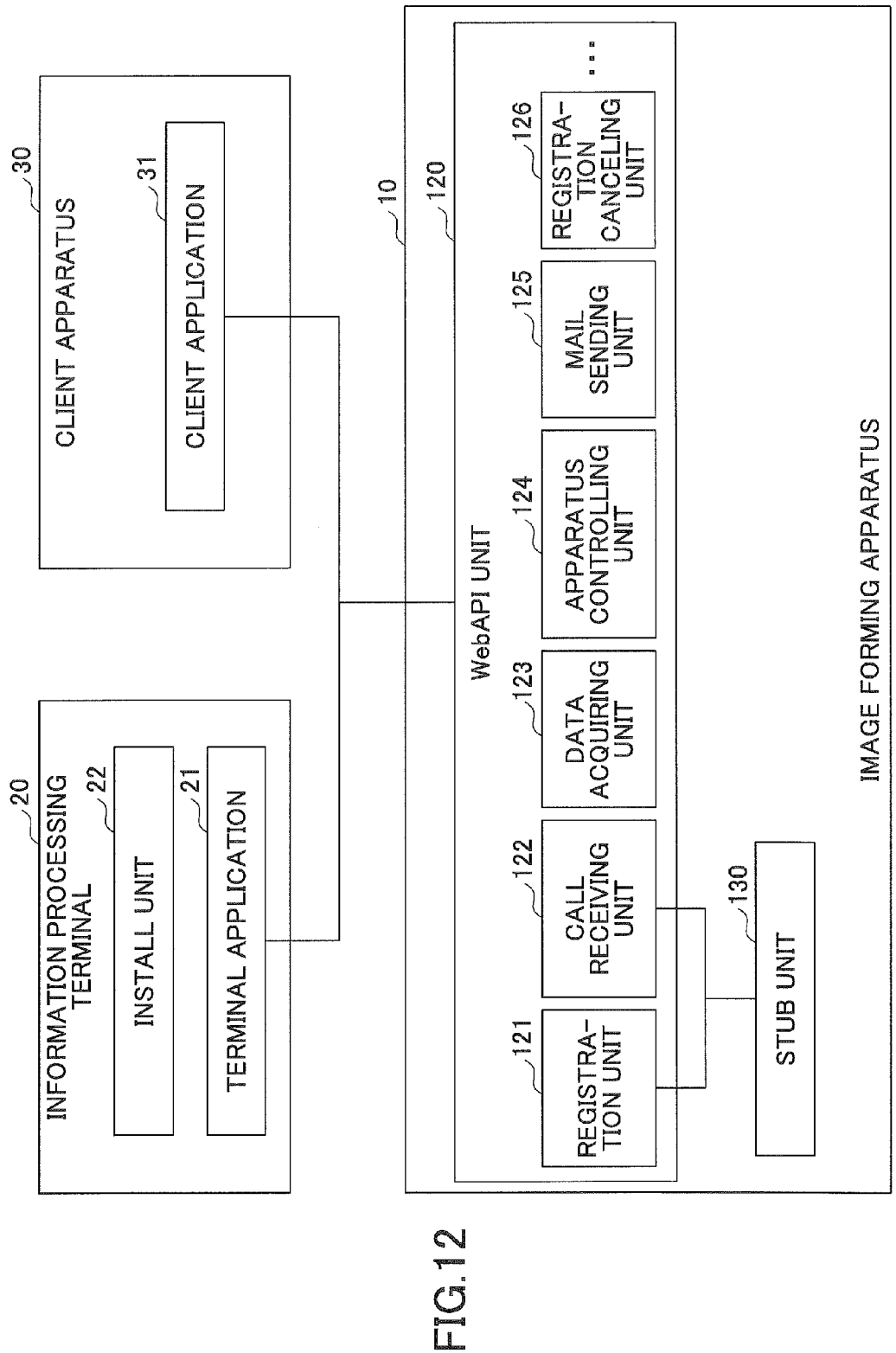
FIG. 12 illustrates an exemplary structure of functional capabilities of apparatuses of a third embodiment.

FIG. 12 illustrates an exemplary structure of functional capabilities of apparatuses of the third embodiment. Referring to FIG. 12, the same reference symbols as those in FIG. 5 are given to the same portions, and explanation of these portions is omitted.

Referring to FIG. 12, the information processing terminal 20 includes an install unit 22. The install unit 22 controls an install process and a uninstall process of the terminal application 21.

The WebAPI unit 120 of the image forming apparatus 10 further includes a registration canceling unit 126. The registration canceling unit 126 corresponds to a registration canceling function being one of the WebAPI. The registration canceling function is a function for receiving a registration canceling request of requesting to cancel a registration of the extension program associated with a certain terminal application 21 or a certain client application 31.

FIG. 13 is a sequence chart illustrating an exemplary procedure of a process performed by the information processing terminal and the image forming apparatus of the third embodiment.

In step S301, the install unit 22 receives an instruction of uninstalling any one of the terminal applications 21 installed in the information processing terminal 20 from the user. This user is, for example, an operator of the information processing terminal 20. The install unit 22 uninstalls (deletes) the terminal application 21 related to the instruction from the information processing terminal 20.

Subsequently, the install unit 22 calls the registration canceling function being one of the WebAPI by designating the application ID of the uninstalled terminal application 21 (step S302). Said differently, the install unit 22 sends the registration canceling request for the extension program to the image forming apparatus 10. The registration canceling request includes the application ID of the uninstalled terminal application 21. The call of the registration canceling function may be performed by the terminal application 21 being the object of the uninstall. Within the third embodiment, the registration canceling request is sent along with the uninstall of a certain terminal application 21. Therefore, the registration canceling request may be understood as a report of the uninstallation (the deletion) of the terminal application 21 related to the application ID included in the registration canceling request.

The registration canceling unit 121, which is a part of the WebAPI unit 126, transfers the registration canceling request to the stub unit 130 in receipt of the registration canceling request (step S303). Subsequently, the stub unit 130 searches the extension information memory unit 140 for a record including the application ID included in the registration canceling request (step S304).

In a case where no corresponding record is searched for in step S305, the process on or after step S305 are not performed. In a case where the corresponding record is searched for in step S305, the stub unit 130 deletes the record from the extension information memory unit 140 (step S306).

Subsequently, the stub unit 130 searches the extension information memory unit 140 for a record including the program ID included in each record searched in step S305 (step S307). Step S309 is provided for the program ID for which the corresponding record is not searched in step S308. In step S309, the stub unit 130 deletes the extension program related to the program ID from the storage destination (e.g., the HDD 114) of the extension program.

Step S309 is provided for the program ID for which the corresponding record is searched in step S308. This is because there is another terminal application 21 or another client application 31, which is planned to use the extension program related to the program ID.

Although the terminal application 21 is described, a process similar thereto is performed at a time of uninstalling the client application 31.

As described, within the third embodiment, along with the uninstall of the terminal application 21 or the client application 31, the extension program used by the terminal application 21 or the client application 31 is deleted. Therefore, it is possible to reduce a possibility of consuming the memory capacity of the HDD by the already unnecessary extension program.

Within the third embodiment, the extension program used by the terminal application 21 or the client application 31, which is the object of the uninstall, is not deleted in a case where the extension program is planned to be used by the other terminal application 21 or the client application 31. As a result, it is possible to avoid an incorrect action or the like of the terminal application 21 or the client application 31.

The above embodiments may be applied to an apparatus other than the image forming apparatus 10. For example, a projector, a digital camera, an electronic blackboard, a teleconference system, or the like may be replaced by the image forming apparatus 10 in applying the above embodiments.

Within the above embodiments, the image forming apparatus 10 is an example of the apparatus. The information processing terminal 20 and the client apparatus 30 are an example of an information processing apparatus. The registration unit 121 is an example of a receiving unit. The stub unit 130 is an example of an acquiring unit and a call unit. The registration canceling unit 126 is an example of a deletion unit.

According to the embodiments of the present invention, it is possible to improve an operability of operating data stored in the apparatus through a network.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an apparatus has been described in detail, it should be understood that various changes, substitutions, and alterations could be made thereto without departing from the spirit and scope of the invention.

This application is based upon and claims the benefit of priority of the prior Japanese Patent Application No. 2015-004249, filed on Jan. 13, 2015, the entire contents of which are incorporated herein by reference.

What is claimed is:

1. An apparatus, connected to an information processing apparatus through a first network, the apparatus comprising:
   a memory; and
   a hardware processor that implements processes of:
   receiving identification information relating to a program from the information processing apparatus through the first network;
   acquiring the program related to the received identification information from an external program source through a second network; and
   calling the acquired program,
   wherein execution of the acquired program by the processor causes the apparatus to perform a process for data stored in the memory of the apparatus.

2. The apparatus according to claim 1,
wherein the processor calls the acquired program in response to receiving a call request though the first network.

3. The apparatus according to claim 1,
wherein the processor stores the acquired program in the memory of the apparatus, and
wherein, in a case where the processor receives the identification information relating to the acquired program already stored in the memory, the acquired program related to the received identification information is not acquired through the second network.

4. The apparatus according to claim 1,
wherein the execution of the acquired program by the processor implements a process related to the data stored in the apparatus in response to a request from the information processing apparatus.

5. The apparatus according to claim 1,
wherein the execution of the acquired program by the processor causes the apparatus to input data to the apparatus and causes the apparatus to perform a process related to the input data.

6. The apparatus according to claim 1,
wherein the information processing apparatus is an operation unit of the apparatus.

7. The apparatus according to claim 1,
wherein the program is dynamically called.

8. The apparatus according to claim 1,
wherein the data is image data, and
wherein the process implemented by the processor upon execution of the acquired program is an image process relating to the image data.

9. The apparatus according to claim 1,
wherein the processor receives first identification information of a first program and second identification information of a second program through the first network, and the first identification information and the second identification information are installed in the information processing apparatus,
wherein the processor acquires the second program related to the received second identification information through the second network, associates the first identification information and the second identification information, and stores the associated first identification information and the second identification information in the memory of the apparatus, and
wherein the processor further implements processes of:
receiving a request to delete the first program from the information processing apparatus; and
deleting the second program related to the second identification information associated with the first identification information relating to the first program in response to the request to delete the first program.

10. An information processing method of an apparatus connected to an information processing apparatus through a first network, the information processing method comprising:
receiving identification information of a program from the information processing apparatus through the first network;
acquiring the program related to the received identification information from an external program source through a second network; and
calling the acquired program, and
executing the program to cause the apparatus to implement a process for data stored in the apparatus.

11. The information processing method according to claim 10, further comprising:
receiving a call request though the first network, wherein the program is called in response the receipt of the call request.

12. The information processing method according to claim 10, further comprising:
storing the acquired program in a memory of the apparatus, wherein, in a case where the identification information of the program stored in the memory is received, the program related to the identification information is not acquired through the second network.

13. The information processing method according to claim 10, further comprising:
receiving a request to execute the acquired program from the information processing apparatus,
wherein the program is executed to implement the process for the data stored in the apparatus in response to the received request.

14. The information processing method according to claim 10,
wherein execution of the program causes the apparatus to implement processes of inputting the data to the apparatus and performing the process for the input data.

15. The information processing method according to claim 10,
wherein the information processing apparatus is an operation unit of the apparatus.

16. The information processing method according to claim 10,
wherein the program is dynamically called.

17. The information processing method according to claim 10,
wherein the data is image data, and
wherein the process implemented by the apparatus is an image process relating to the image data.

18. The information processing method according to claim 10,
wherein the identification information received through the first network includes first identification information of a first program and second identification information of a second program, and the first identification information and the second identification information are installed in the information processing apparatus,
wherein the second program related to the received second identification information is acquired through the second network, the first identification information is associated with the second identification information, and the associated first identification information and the second identification information are stored in a memory of the apparatus,
wherein the information processing method further comprises:
receiving a request to delete the first program from the information processing apparatus; and
deleting the second program related to the second identification information associated with the first identification information relating to the first program, in response to the request to delete the first program.

19. A non-transitory computer-readable recording medium on which a computer program product for causing a computer, included in an apparatus connected to an information processing apparatus through a first network, to execute an information processing method, the information processing method comprising:

receiving identification information of a program from the information processing apparatus through the first network;

acquiring the program related to the received identification information from an external program source through a second network; and calling the program acquired by the acquiring, executing the program to cause the apparatus to implement a process for data stored in the apparatus.

* * * * *

UNITED STATES PATENT AND TRADEMARK OFFICE
CERTIFICATE OF CORRECTION

PATENT NO. : 9,723,161 B2
APPLICATION NO. : 14/987902
DATED : August 1, 2017
INVENTOR(S) : Ryoji Araki It is certified that error appears in the above-identified patent and that said Letters Patent is hereby corrected as shown below:

On the Title Page

Item (54): Please correct the Title of Invention from:

"APPARATUS, INFORMATION PROCESSING SYSTEM, INFORMATION PROCESSING METHOD, AND INFORMATION PROCESSING PROGRAM FOR CHANGING OR PROVIDING FUNCTIONAL CAPABILITIES IN AN APPARATUS"

To:

"APPARATUS, INFORMATION PROCESSING SYSTEM, INFORMATION PROCESSING METHOD, AND INFORMATION PROCESSING PROGRAM FOR CHANGING OR PROVIDING ADDITIONAL FUNCTIONAL CAPABILITIES IN AN APPARATUS"

Signed and Sealed this
Eighth Day of May, 2018

Andrei Iancu
*Director of the United States Patent and Trademark Office*